US009445551B2

(12) United States Patent
Chapman et al.

(10) Patent No.: US 9,445,551 B2
(45) Date of Patent: Sep. 20, 2016

(54) METHOD AND APPARATUS FOR USING LIGHT EMITTING DIODES IN A GREENHOUSE SETTING

(75) Inventors: Kirk Chapman, Odense SO (DK); Thomas Rubaek, Odense C (DK); John Erland Oestergaard, Odense M (DK); Soeren Hassing, Svendborg (DK); Poul Lindstorff Johansen, Odense S (DK); Jens Joergen Loensmann Iversen, Odense C (DK)

(73) Assignee: FIONIA LIGHTING APS, Odense M (DK)

( * ) Notice: Subject to any disclaimer, the term of this patent is extended or adjusted under 35 U.S.C. 154(b) by 1162 days.

(21) Appl. No.: 12/993,211

(22) PCT Filed: May 15, 2009

(86) PCT No.: PCT/EP2009/055959
§ 371 (c)(1),
(2), (4) Date: Feb. 2, 2011

(87) PCT Pub. No.: WO2009/141287
PCT Pub. Date: Nov. 26, 2009

(65) Prior Publication Data
US 2011/0183368 A1 Jul. 28, 2011

Related U.S. Application Data

(60) Provisional application No. 61/055,223, filed on May 22, 2008.

(51) Int. Cl.
C12M 1/00 (2006.01)
C12M 3/00 (2006.01)
(Continued)

(52) U.S. Cl.
CPC ............... A01G 9/26 (2013.01); A01G 7/045 (2013.01); F21V 15/013 (2013.01); F21V 29/30 (2013.01); F21Y 2101/02 (2013.01); F21Y 2105/008 (2013.01); Y02P 60/149 (2015.11)

(58) Field of Classification Search
CPC ...... A01G 9/26; A01G 7/045; F21V 15/013; F21V 29/30; F21Y 2101/02; F21Y 2105/013
USPC ............ 435/29, 287.1, 292.1; 315/152, 294; 47/17
See application file for complete search history.

(56) References Cited

U.S. PATENT DOCUMENTS

| 2003/0005626 A1 | 1/2003 | Yoneda et al. |
| 2007/0115656 A1* | 5/2007 | Chou ........................ F21K 9/00 362/228 |
| 2008/0089071 A1 | 4/2008 | Wang |
| 2009/0047722 A1* | 2/2009 | Wilkerson et al. ........ 435/173.7 |

FOREIGN PATENT DOCUMENTS

| EP | 1 300 066 A1 | 4/2003 |
| EP | 1 574 126 A1 | 9/2005 |

(Continued)

OTHER PUBLICATIONS

Machine Translation of NL 1031466. Apr. 24, 2013.*

Primary Examiner — Michael Hobbs
(74) Attorney, Agent, or Firm — Merchant & Gould P.C.

(57) ABSTRACT

A modular LED system is provided that includes a frame having a plurality of light emitting diodes (LEDs) of at least two different colors for generating light within a color spectrum. The LEDs are mounted on or adjacent to a plate equipped with cooling medium for cooling the LEDs. The system includes a processor for controlling an amount of electrical current supplied to the LEDs to determine a color of light generated by the LEDs, and a flat translucent member having translucent lenses for decreasing or increasing the diffusion angle for light emitted from each LED. The system is suitable for illuminating plants to supplement natural light without substantially interfering with the amount of natural light due to its narrow width. The system delivers uniform illumination and reduces energy and maintenance costs. The system may be installed in a commercial greenhouse.

20 Claims, 2 Drawing Sheets

(51) Int. Cl.
  *A01G 9/26* (2006.01)
  *A01G 7/04* (2006.01)
  *F21V 15/01* (2006.01)
  *F21V 29/00* (2015.01)
  *F21Y 101/02* (2006.01)
  *F21Y 105/00* (2016.01)

(56) References Cited

FOREIGN PATENT DOCUMENTS

| | | |
|---|---|---|
| NL | 1031466 | 8/2007 |
| WO | WO 2007/147242 A1 | 12/2007 |

\* cited by examiner (a)

(b)

(c)

METHOD AND APPARATUS FOR USING LIGHT EMITTING DIODES IN A GREENHOUSE SETTING

This application is a National Stage Application of PCT/EP2009/055959, filed May 15, 2009, which claims benefit of Ser. No. 61/055,223, filed May 22, 2008 in the United States and which applications are incorporated herein by reference. To the extent appropriate, a claim of priority is made to each of the above disclosed applications.

FIELD OF THE INVENTION

The present invention relates to a method and apparatus for using light emitting diodes in a greenhouse setting. More particularly, it relates to a method of using LEDs to supplement natural light and a support structure for using LEDs in a greenhouse setting. Also, the present invention relates to systems and methods for controlling the diffusion angle of the LED light, so as to permit even illumination of a surface.

DESCRIPTION OF RELATED ART

Sunlight is made up of a variety of wavelengths. The energy of light is inversely proportional to its wavelength. In other words, the longer the wavelength the less energy the light has. Sunlight can be separated into different wavelengths or colors by passing it through a prism. Similarly, when the sun is at an angle to the earth's atmosphere, the light is reflected and spread by the atmosphere. This is why sunrises and sunsets are so colorful. Another less desirable result of this phenomenon is that a portion of blue light is not transmitted through the atmosphere during the winter.

The light humans see is in the visible spectrum. Visible light ranges from approximately 400 nm to approximately 700 nm. Violet light is the shortest wavelength; highest energy light of the visible spectrum and red light is the longest wavelength, lowest energy light of the visible light. The longer the wavelength of visible light the more red its color. Ultraviolet light has a shorter wavelength and has more energy than visible light. X-rays are the highest energy, shortest wavelength light. Infra red light is a low energy light, having a wavelength longer than that of red light. A large portion of sunlight is in the infrared range.

Photosynthesis is the process that converts energy from sunlight or other light to chemical forms of energy that can be used by biological systems. Energy for photosynthesis is provided by light, which is absorbed by the pigments of the plant.

The color and intensity of light are used in different photosynthesis reactions. The brighter or more intense the light, the more energy the plant receives. Red light promotes height and blue light promotes growth in girth. Thus, plants grown in red light will be tall and spindly and plants grown in blue light will have a thick, strong stem, but will not be especially tall.

In greenhouses, it is often desirable to control a plant's growth. For example, due to conditions, customer or seasonal demands, transportation issues, etc. it may be desirable to promote or inhibit budding, promote or inhibit flowering, promote germination, promote the leafiness of the plant, encourage a strong and/or lengthy stem, have a stronger plant, have a bigger harvest, and/or promote or inhibit ripening of a fruit or vegetable.

Commonly, greenhouses will use lights to encourage or discourage plant growth. Common types of lighting for landscapes and greenhouses include incandescent lights, fluorescent lights, high-pressure sodium lights, metal halide lights, and mercury vapor lights. Incandescent lights produce all wavelengths of light and are closest to natural sunlight. Thus, they are commonly used to promote vegetative growth. The intensity of particular wavelengths of light may be adjusted with the type of lights used to control growth mode. In addition to controlling growth modes with light, growth modes can also be controlled by adjusting or changing the fertilizer, stressing the plant such as with cold, shorter or longer lighted periods or by adding a lighted period at night.

In the winter the sun is lower on the horizon. When sunlight passes through the ozone layer about 50% of the blue light is reflected off the ozone layer rather than being transmitted. Incandescent lights, while mimicking natural light tends to be comprised of a higher percentage of low energy light than natural light. Thus, a plant grown under incandescent light or under natural winter light tends to get less blue light than is optimal. There is a need for a system which can be used to supplement the natural light in the winter by providing the short wavelengths reflected by the ozone layer to the plants with minimal interference to the amount of natural light.

Flower producers may wish to grow leafy, strong plants, but discourage flowering until it is the season for the plant. A greenhouse vegetable producer may wish to encourage germination growth, budding and fruiting of plants but then inhibit ripening of the vegetable so that is not overly ripe at the time it reaches the food market. Thus, there is a need for a plant illumination system which allows the grower to supplement natural light to adjust the growth mode of plants without interfering with the amount of natural light received.

Light Emitting Diodes (LED) consists of a layer of two different semi-conductors. They can be used to provide a source of light with a specific wavelength. Currently, light emitting diodes LEDs have been used for low light, small size greenhouse environments. There is a need for a LED plant illumination system, which allows for the use of LEDs on a large scale, such as a commercial greenhouse.

There is a need for a plant illumination system, which makes use of LEDs to provide the desired light intensity and/or wavelength to promote or discourage specific growth modes without interfering with the natural light. There is also a need for a system that can be used with natural light, artificial light or a combination of artificial and natural light without blocking a significant amount of the light.

Prior art lighting systems for greenhouses are about 18 cm wide and, thus, block a portion of the natural light. There is a need for a system that reduces the amount of blocked natural light.

Prior art lighting systems are heavy. A single sodium vapor lamp can weigh 20 kg. There is a need for a light-weight lighting system.

The lamps of prior art lighting systems must be placed far above the plants. There is a need for a lighting system which optionally can be located closer to the plants.

SUMMARY OF THE INVENTION

The present invention relates to an illumination system for plants to supplement natural light without substantially interfering with the amount of natural light. The present invention uses LEDs that deliver uniform illumination. The LEDs reduce energy and maintenance costs. The system may be installed in a commercial greenhouse. Because of its narrow width, the system is useful to supplement natural light because it allows a maximum amount of natural light to reach the plants.

In accordance with the present invention there is provided a modular LED system comprising:
- a frame having;
- a plurality of light emitting diodes (LEDs) of at least two different colors for generating light within a color spectrum, said LEDs being mounted, preferably clickable, on or adjacent to a, preferably heat conductive, plate equipped with cooling means for cooling the LEDs with cooling medium;
- a processor for controlling an amount of electrical current supplied to the plurality of LEDs, so that a particular amount of current supplied thereto determines a color of light generated by the plurality of LEDs; and
- a flat translucent member having translucent lenses associated with the LEDs for decreasing or increasing the diffusion angle for light emitted from each LED;

wherein the frame is provided with a tunnel for receiving a tube carrying power and optionally cooling medium for the LED system.

The tunnel for receiving a tube carrying power and optionally cooling medium is herein defined as an opening in the frame, wherein electrical plug-ins as well as connections for cooling medium are provided. The wording of optionally cooling medium for the LED system is used to indicate that the cooling medium can be introduced into the frame separate from the tube carrying power.

In one embodiment of the present invention, LEDs with specific wavelengths are used in the system for a specific effect. For example, blue LEDs to supplement the winter sunlight.

In another embodiment of the present invention the plants are exposed to sunlight and/or artificial lights, preferably, natural light or sunlight and LEDs are used to supplement the light. For example, in winter high frequency light is reflected off the ozone layer. Blue LEDs are used to supplement the natural light to compensate for the high frequency light that is not transmitted by the ozone layer. In addition, when specific wavelengths are needed for a desired effect, additional LEDs may be provided which emit light at the desired wavelengths.

The LED system of the present invention has been modified to provide substantially uniform illumination of a surface. In one embodiment, the modular LED system comprises a plurality of light emitting diodes (LEDs) of at least two different colors for generating light within a color spectrum, a processor for controlling an amount of electrical current supplied to the plurality of LEDs, so that a particular amount of current supplied thereto determines a color of light generated by the plurality of LEDs, a heat sink, and a translucent member associated with the LEDs for determining a diffusion angle of light emitted from each LED. The presence of a translucent member can permit the control of the diffusion angle of the light emitted from the LEDs to provide substantially uniform illumination of a surface. In a preferred embodiment the LEDs can be clicked onto the module.

In accordance with a preferred embodiment of the present invention the translucent member is provided with a plurality of lenticular lenses disposed on or in the translucent layer. The translucent layer and the lenticular lenses are positioned in spaced relation to the LEDs, with each lenticular lens over at least one LED to affect the diffusion angle of the emitted light. To engage the LED, each lenticular lense may include a recess adapted to complementarily receive at least one LED.

The modular LED lighting system may further include a processor to control an amount of electrical current supplied to the plurality of LEDs, so that a particular amount of current supplied thereto determines a color of light generated by the plurality of LEDs. In such embodiments, controlling the amount of electrical current supplied to the plurality of LEDs can affect the color of light generated by the plurality of LEDs. The modular LED system may also include a connector for removably coupling in series a plurality of translucent member and LEDs. The modular LED system may additionally have a power module for providing electrical current from a power source to the LED, and, optionally, an electrical connector for removably coupling the LED system to the power module. In certain embodiments, a modular LED system includes means for programming the processor and/or a mechanism for facilitating communication between the LEDs and the processor.

The modular LED lighting system, in accordance with another embodiment of the invention, may also provide a color gradient or color grid along the surface. To generate such a gradient or grid, light emitted from each LED or group of LEDs may be of a distinct color, and may be provided with a particular diffusion angle, so as to permit the light from that LED or group of LEDs to illuminate a specific region of the surface.

In accordance with another embodiment of the present invention, a method for manufacturing a modular LED system is provided. In particular, a plurality of LEDs is first arranged in a predetermined array. Subsequently a member having a plurality of spatially adjustable lenses arranged in an array similar to that of the plurality of LEDs is provided, each lens having a recess to complementarily receive an LED. Thereafter, the plurality of LEDs is engaged with the plurality of lenses so that each lens complementarily receives an LED.

LEDs (Light Emitting Diode) have the advantage that their spectrum can be designed such that it exactly meets the requirements of plants. The said advantage also applies to all types of LEDs, including OLEDs (Organic Light Emitting Diodes), which is a special type of a light emitting diode in which the emissive layer may comprise a thin film of certain organic components. The expression LED is meant to comprise OLEDs. The advantage of the OLED is that it is a homogeneous large area light source with potentially low cost and high efficiency and hence, OLEDs are better suited for horticulture applications where the total cost of ownership is important. These OLEDs utilize current flowing through a thin-film of organic material to generate light. The color of light being emitted and the efficiency of the energy conversion from current to light are determined by the composition of the organic thin-film material. However, the OLEDs comprise a substrate material as a carrier layer, which may be made of glass or an organic material or from non transmittive materials such as metal foils. Furthermore, organic light emitting diodes consist of at least one very thin layer with a layer thickness of approx. 5-500 nm of organic substances on a glass substrate covered with an electrically conducting and optically transparent oxide. This conducting layer usually is performed as Indium-Tin-Oxide (ITO). Usually the ITO-layer forms the anode and a layer of Aluminum forms the cathode, whereas the Aluminum layer features a thickness of approx. 100 nm and thus a thickness like the ITO-layer. Aluminum of such a thickness works as a mirror, such that the emission is through the transparent ITO anode and the transparent substrate only. If the cathode metal is thin enough to be partially transparent, part of the light can also be emitted through the cathode. By using other appropriate materials as cathode, the OLED can be made optical transparent. In this case the OLED may work as a kind of window, which at daytime is letting the sunlight falling into the greenhouse. But at nighttime the OLED may work as a lighting mean, illuminating the greenhouse.

According to another embodiment of the invention the lighting element can consist of an array of OLEDs, comprising at least two different groups of OLEDs, wherein the first group of OLEDs deliver a grow light and the second group of the OLEDs deliver a control light for the plant. It is known, that the sheer growth of the plant is mainly depending on the amount of light, possessing the wavelength absorbed by Chlorophyll A or B. To achieve a generous growth of the plant the first group of OLEDs of the light emitting element should consists of at least two types of OLEDs, emitting at different wavelength. It is preferred that the first type of OLED emits in the region of blue light with a wavelength between 400 nm to 500 nm. Furthermore, the second type of OLED should emit in the region of red light between 600 to 700 nm. In another preferred embodiment the grow light emitted by the first group of OLEDs can consists of approximately 80% to 90% red light and 10% to 20% blue light.

In addition to the described grow light, a control light should be used to steer the growth of the plant. The growths of a plant whether it is huge or small and compact can be controlled by illuminating the plant with light of different colors. It is known, that the use of a large amount of blue light (400 nm to 500 nm) results in a tall plant whereas the use of a small amount of blue light results in a small and compact plant. Furthermore, the light in the green spectrum increases the tendency of the plant to propagate. In addition, by using light with the appropriate wavelength the blooming of the plants can be controlled. So by controlling the type of wavelength being emitted onto the plants, the way and the manner of the growing of the plant can be controlled.

It is an aim of the present invention to promote the growth, development and health of plants. Another aim of the invention is to realize substantial energy savings. The invention comprises enhanced monitoring or sensing the growth, development and/or health of the relevant plants and adequate "fine tuning" of the properties of their illumination.

To that end it is preferred, according to the present invention, in a greenhouse system which comprises the modular LED lighting system for the illumination of plants etc. inside the greenhouse for the benefit of plant growth, to include sensor means for measuring one or more variables which are directly or indirectly related to the growth, development or health of those plants or relevant groups of plants, as well as control means which are arranged to control the illumination in dependency of the output of the sensor means.

It is highly preferred, in such a greenhouse system, that the illumination with the modular LED lighting system and control means are arranged to vary the intensity as well as the spectral distribution of the light emitted by the modular LED lighting system.

As known as such from the prior art, the emitted light may be pulsed light, wherein, according to a preferred option of the invention, the pulse characteristics may be varied by the control means in dependency of the output of the sensor means.

It is preferred that the control means are arranged to interpret the relevant variables measured by the sensor means and to assess the actual and/or expected growth of the relevant plants, and to control the intensity and/or the spectral distribution of the light emitted by the illumination means to those relevant plants in accordance with the assessment result.

E.g. in greenhouses which are arranged to use incident (sun) light, one or more sensors may be provided for measuring the intensity and/or spectral distribution of the actual light in the greenhouse, thus enabling that such incident light may be e.g. filtered, screened etc. by filters, screens etc., or that the incident light is supplemented by the artificial, spectrally "fine tuned" illumination.

One or more sensors may be provided for measuring one or more plant dimensions, e.g. the size of the plant roots, leafs, stems, fruits or flowers, of the relevant plants or groups of plants.

Finally, it is noted that, to still increase the energy efficiency of the greenhouse system (which, after all, was one aim of the present invention), the LED modules of the present invention may be cooled by means of a cooling medium, e.g. a fluid or air, which cooling medium preferably can be connected to a heating or air conditioning system of the greenhouse, thus enabling that the energy which in the LED modules is not converted into light but into heat, can be recuperated. This is a special opportunity of LED modules, as in LEDs, as a result of their nature, the heat is mainly generated at the backside of the LEDs (contrary to e.g. in sodium lamps etc. which radiate their heat from their illuminating front side) and, due to that, can be collected from the backside of the modules without hindering the light emission at the frond side, and can, via a cooling medium and a circulation system, be supplied to the greenhouse's heating or air conditioning system or any other heating or air conditioning system.

The present invention also provides system for screening the photosynthetic activity of a plant material, said system comprising a closed photobioreactor illuminated with one or more modular LED systems of the present invention.

In accordance with the present invention there is also provided a method for screening optimum illumination of a plant material, comprising the steps of placing the plant material in a bioreactor illuminated with one more modular LED systems of the present invention, and measuring the CO2 production rate of the plant material by various light intensities.

It is also an object of the invention to provide an improved reactor for the cultivation of phototrophic micro organisms such that sunlight is converted more efficiently into biomass. In a further aspect of the invention, it is an object to provide a process for the cultivation of phototrophic micro organisms in which sunlight is more efficiently converted into biomass.

According to the invention, there is provided a reactor for the cultivation of phototrophic micro organisms comprising:
i) one or more compartments suitable for containing a liquid comprising an phototrophic micro organism culture,
ii) an inlet for supplying a CO2 comprising gas flow to the one or more compartments,
iii) an outlet for removing gas from the one or more compartments, a
iv) means for regulating the temperature of the phototrophic micro organism culture, and
v) an LED system of the present invention to illuminate the phototrophic micro organisms.

Moreover, the present invention is directed to a system for controlling optimum illumination of plants in a greenhouse, said system comprising:

a photobioreactor comprising means for screening the photosynthetic activity, which photobioreactor is illuminated with an LED system of the present invention in addition to incoming sun light, said photobioreactor is also equipped with one or more photodiodes that measure the intensity of the incoming sunlight;

a computer for treating data received from the means for screening the photosynthetic activity, and which computer implements a program that
i) screens the photosynthetic activity of the plant material of the photobioreactor illuminated with light of various wavelength and intensity;
ii) measures the incoming sunlight and if the intensity thereof decreases it increases the intensity of the LEDs; and
iii) controls the illumination of the plants in the greenhouse by illuminating the plants with light having a composition of wavelength and intensity which has given rise to the highest photosynthetic activity in the photobioreactor.

Also, the present invention concerns a method for controlling optimum illumination of plants in a greenhouse, said method comprising the steps:
providing a photobioreactor for screening the photosynthetic activity of a plant material placed in the bioreactor, which photobioreactor is illuminated with an LED system of the present invention in addition to incoming sun light; and
providing a computer for treating data received from the means for screening the photosynthetic activity;
wherein the computer screens the photosynthetic activity of the plant material of the photobioreactor illuminated with light of various wavelength and intensity, and then controls the illumination of the plants in the greenhouse by illuminating the plants with light having a composition of wavelength and intensity which has given rise to the highest photosynthetic activity in the photobioreactor.

As in many of the above discussed embodiment one or more photodiodes may be used to compensate for reduced incoming sublight due to seasonal variations or cloudy weather.

In certain embodiments, the systems and methods described herein utilize a current control for the lighting assembly, which may be a pulse width modulated ("PWM") current control or other form of current control where each current-controlled unit is uniquely addressable and capable of receiving illumination color information on a computer lighting network. As used herein, "current control" means PWM current control, analog current control, digital current control, and any other method or system for controlling current.

DETAILED DESCRIPTION OF THE INVENTION

Figure 1:
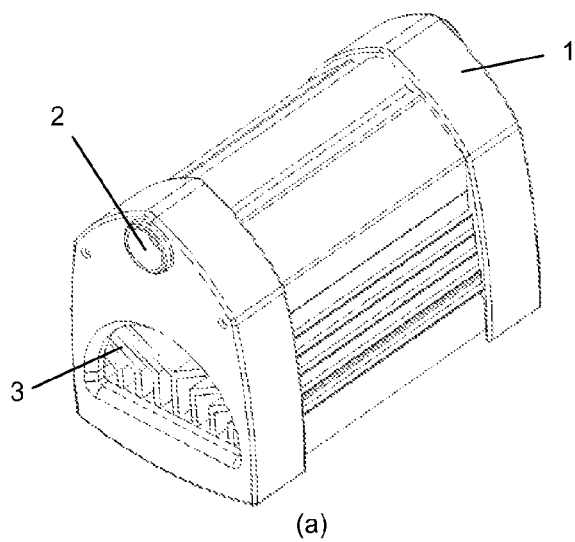
FIG. 1 shows three views of one embodiment of the present invention with cooling ribs: (a) upper view, (b) lower view and (c) lower view with end housing removed to reveal inner structure.
Figure 1:
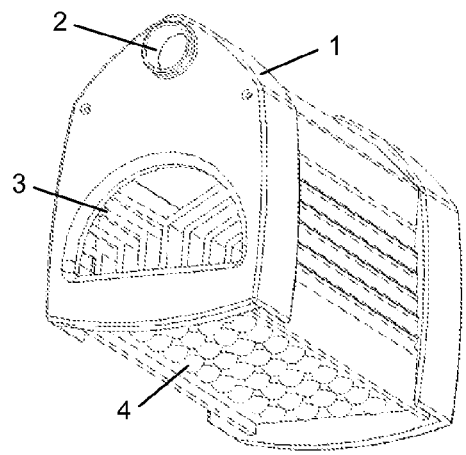
Figure 1:
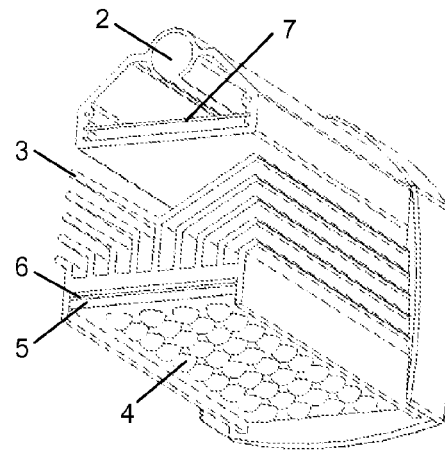

Plants grow due to photosynthesis. Plants use water, carbon dioxide and light to create energy and oxygen. Different wavelengths of light affect plants differently. The best light for most plant growth is in the red and blue wavelengths.

The maximum transmission of blue light occurs about midday. Because of the angle of the sun, the high-energy blue light tends to be reflected off the ozone layer in the morning and evening. Thus, there is less blue in the light. Similarly, there is less blue light in the winter because the earth is at an angle to the sun. In the winter about 50% of the high-energy blue light is reflected by the ozone layer and the light that is transmitted consists primarily of lower-energy light. As a result, plants may not get sufficient amounts of blue light.

Plants grown under artificial light may also be deficient in blue light. For example, high intensity sodium lamps, which are often used in greenhouses, maximize the light that can be seen by humans. Incandescent lights, which are often used in home plant growing situations, also have less blue light than the amount needed for optimal plant growth. A grower may want to supplement the amount of blue light. In some situations, the grower may wish to encourage or discourage particular plant growth modes with specific wavelengths of light. Thus, it is often necessary or desirable to supplement natural or artificial light with specific wavelengths of light.

Prior art lighting systems block a portion of the natural light entering the greenhouse. Prior art systems utilize bulky lights that block 10% or even more of the footprint of the lighted area of the greenhouse. This undesirable effect is worsened by shadows that are cast by the frame and/or lights. The prior art system uses a plurality of lights. For example, in a typical system using high-pressure sodium (HPS) lamps, the reflector of the lamp is 35 cm wide by 35 cm long, the power supply of the lamp is about 18 cm wide by 38 cm long, and the attachment supports are about 4 cm wide. The greenhouse support frame is about 3 cm wide.

Another disadvantage of prior art systems is uneven lighting. Some plants are illuminated by two lamps while others are illuminated by three. As a result, the plants may not grow and mature at the same rate. Some plants may mature slowly or will not grow as large as others.

Prior art lighting systems are heavy, a single sodium vapor lamp can weigh 20 kg. Thus, the greenhouse frame needs to be strong enough to support the lighting system. Further, prior art lighting systems have lamps that must be kept away from the plants. This requires the greenhouse structures be of sufficient height to keep the lights away from the plants.

The light engine comprises a board, preferably a metal core with a plurality of LEDs mounted thereon. The board is in the form of a plate that can be mechanically attached to a frame. Preferably, the LEDs are power package LEDs. Preferably, the LEDs are spaced equally along the plate. The LEDs are powered by a power supply. Preferably, the board is connected to the power supply by wires and the power supply is remote from the light engine. The power supply can power more than one light engine. Preferably the light engine is attached to an electrically conductive wire, wherefrom it supplied with power. Alternatively the light engine is mounted on a tube, which in addition to provide the light engine with power also provides a gas flow for cooling purposes.

The light engines are relatively light. Thus, the greenhouse can be built so the frame can support the greenhouse. Extra weight of the lamps does not need to be a consideration when determining the frame strength and/or design.

Further, the LEDs can be located close to or away from the plants. Thus, the light engines can be retrofit on an existing greenhouse frame. In addition, because the LEDs do not have to be kept away from the plants, the greenhouse can be built lower to the ground. This saves materials and may allow lighter weight frames to be used. It may also allow for reduced heating and/or cooling costs since the room to be heated or cooled may be smaller than in conventional greenhouses.

FIG. 1 shows three views of one embodiment of the present invention with cooling ribs: (a) upper view, (b) lower view and (c) lower view with end housing removed to reveal inner structure. The LED lighting system comprises a modular housing 1, a tunnel 2 for insertion of a pipe/cable for transport of power and possibly other connections to the LED system. Cooling ribs 3 are used to effectively transfer heat away from the LEDs. Each individual LED (not shown) is provided with a lens 4 to give uniform illumination of the plants. These lenses are formed as part of an injection moulded clear plastic lens array 5, behind which the LED circuit board 6 is mounted. The electronics board 7 containing the control processor and providing power to the LEDs is mounted in the upper part of the modular housing.

Figure 2:
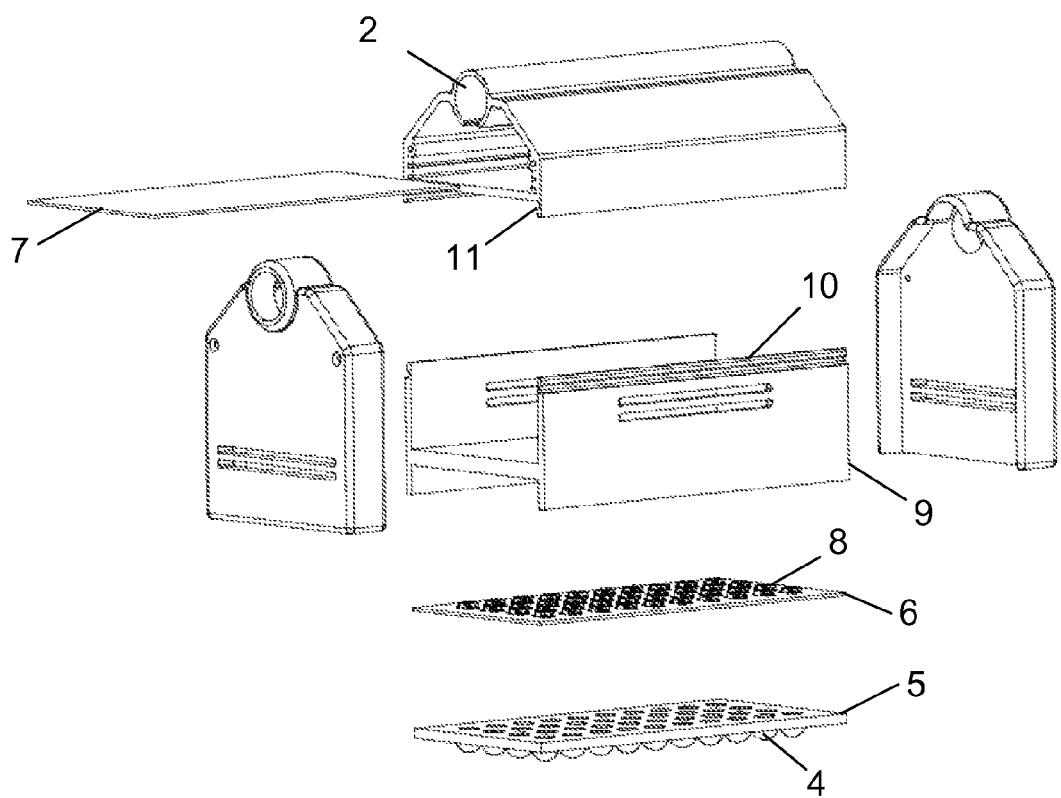
FIG. 2 shows an exploded view of an embodiment of the present invention utilizing a click system for releasable mounting of the lower housing containing the LEDs and lens array.

FIG. 2 shows an exploded view of an embodiment of the present invention utilizing a click system for releasable mounting of the lower housing containing the LEDs and lens array. In this view, the recesses for accepting the LEDs can be seen in the lens array 5, and the bases of the reverse mounted LEDs 8 can be seen on the circuit board 6. The light emitting part of each LED is placed in a hole in the board to allow illumination out through the lens array. The lens array and LED board are in turn mounted on the lower housing module 9, which can be clicked on to the rest of the modular housing a toungue 10 and groove 11 system.

EXAMPLE

In order to clarify the objective of the present invention a case study is presented. Growing the flower *Campanula* requires high intensity artificial light, in order to ensure high plant quality throughout the year. PKM NS is a Danish greenhouse/nursery, who among other crops grows app. 11 mill *Campanula* yearly. The electricity bill for lighting is about ⅔ of the utility bill, meaning that the interest in energy savings regarding electricity is high. The traditional "high pressure sodium" lamp is an efficient system regarding light output, but inefficient in terms of providing the correct wavelengths for high photosynthetic activity. By changing HPS with the LED system of the present invention the Nursery owner is subject to an electrical energy saving of 50%. The system used comprises two colors of LED equipped with cooling means and in front of the LEDs a flat translucent member is provided. The cooling medium is transferred into and out of the fixture using a tunnel. The energy taken from the fixtures with the cooling medium is reused in the greenhouse for e.g. heating purposes.

The invention claimed is:

1. A modular LED system comprising:
a frame comprising a first end, a second end, two sides, an upper portion, and a lower portion comprising a bottom, the frame defining a longitudinal axis extending from the first end to the second end;
a plurality of light emitting diodes (LEDs) of at least two different colors for generating light within a color spectrum, said plurality of LEDs being mounted on or adjacent to a plate attached to the frame at the lower portion parallel to the longitudinal axis of the frame, wherein the plurality of LEDs is disposed in a grid on the plate and oriented to emit light in a direction perpendicular to the plate;
one or more cooling ribs mounted onto the frame and positioned on a side of the plate opposite of the direction of light for cooling the LEDs with cooling medium;
a processor for controlling an amount of electrical current supplied to the plurality of LEDs, so that a particular amount of current supplied thereto determines a color of light generated by the plurality of LEDs; and
a flat translucent member having a plurality of translucent lenses, wherein the flat translucent member is positioned adjacent and parallel to the plate, each translucent lens corresponding to one LED of the plurality of LEDs, wherein the translucent lenses are constructed to control the diffusion angle of the light emitted from the LEDs to provide substantially uniform illumination of a surface;
wherein the frame is provided with a tunnel for receiving a tube carrying power and optionally cooling medium for the LED system, and wherein all LEDs of the modular LED system are mounted at the bottom of the frame.

2. The modular LED system as set forth in claim 1, wherein the translucent member includes an array of lenticular lenses disposed on the member.

3. The modular LED system as set forth in claim 1, wherein the translucent member includes a plurality of individual lenticular lenses.

4. The modular LED system as set forth in claim 1, wherein the translucent member includes a recess adapted to complementarily receive at least one LED.

5. The modular LED system as set forth in claim 1, wherein the plurality of LEDs are arranged in a substantially linear array.

6. The modular LED system as set forth in claim 1, wherein the LEDs are in the form of OLEDs.

7. The modular LED system as set forth in claim 1, further comprising a power module for providing electrical current from a power source to the LED system.

8. The modular LED system as set forth in claim 1, wherein the processor is configured as an addressable processor capable of receiving data from a network.

9. The modular LED system as set forth in claim 1, wherein the processor is configured to control the plurality of LEDs using signals selected from the group consisting of pulse modulated signals, pulse width modulated signals, pulse amplitude modulated signals, pulse displacement modulated signals, analog signals, and combinations and/or modulations thereof.

10. The modular LED system as set forth in claim 1, wherein the control of the LEDs is determined by the intensity of the incoming sun light and/or the intensity of the light from the modular LED system thereby compensating for the reduced or increased intensity of the sunlight during winter or cloudy weather, or the intensity of the light from the modular LED system.

11. The modular LED system as set forth in claim 1, wherein the plurality of LEDs includes at least a first color LED and a second color LED, wherein the electrical current includes a first current supplied to the first color LED and a second current supplied to the second color LED, and wherein the processor controls respective amounts of the first and second currents to vary the color of the light generated by the plurality of LEDs.

12. A system for screening the photosynthetic activity of a plant material, said system comprising a closed photobioreactor illuminated with one or more modular LED systems according to claim 1.

13. A method for screening optimum illumination of a plant material, comprising:
    placing the plant material in a bioreactor illuminated with one or more modular LED systems according to claim 1, and
    measuring the CO2 production rate of the plant material by various light intensities.

14. A system for controlling optimum illumination of plants in a greenhouse, said system comprising:
    a photobioreactor comprising means for screening the photosynthetic activity;
    a modular LED system according to claim 1, wherein the photobioreactor is illuminated with the modular LED system in addition to incoming sun light; and
    a computer for treating data received from the means for screening the photosynthetic activity, and which computer implements a program that
        i) screens the photosynthetic activity of the plant material of the photobioreactor illuminated with light of various wavelength and intensity;
        ii) measures the incoming sunlight and if the intensity thereof decreases it increases the intensity of the LEDs; and
        iii) controls the illumination of the plants in the greenhouse by illuminating the plants with light having a composition of wavelength and intensity which has given rise to the highest photosynthetic activity in the photobioreactor.

15. A method for controlling optimum illumination of plants in a greenhouse, said method comprising:
    providing a photobioreactor for screening the photosynthetic activity of a plant material placed in the bioreactor, which photobioreactor is illuminated with the modular LED system according to claim 1 in addition to incoming sun light;
    providing a computer for treating data received from the screening of the photosynthetic activity;
    screening the photosynthetic activity of the plant material of the photobioreactor illuminated with light of various wavelength and intensity, and
    controlling the illumination of the plants in the greenhouse by illuminating the plants with light having a composition of wavelength and intensity which has given rise to the highest photosynthetic activity in the photobioreactor.

16. A greenhouse system, comprising:
    i) a greenhouse for housing and growing plants;
    ii) the modular LED system as set forth in claim 1 inside the greenhouse for the benefit of plant growth;
    iii) sensor means for measuring one or more variables which are directly or indirectly related to growth, development or health of the plants;
    iv) and control means arranged to control illumination from the modular LED system in dependency of an output of the sensor means.

17. The greenhouse system according to claim 16, the modular LED system and control means being arranged to vary intensity and spectral distribution of light emitted by the modular LED system.

18. A reactor for the cultivation of phototrophic micro organisms comprising:
    i) one or more compartments suitable for containing a liquid comprising an phototrophic micro organism culture,
    ii) an inlet for supplying a gas flow comprising $CO_2$ to the one or more compartments,
    iii) an outlet for removing gas from the one or more compartments,
    iv) a means for regulating the temperature of the phototrophic micro organism culture, and
    v) the modular LED system as set forth in claim 1.

19. The modular LED system of claim 1, wherein the plate is heat-conductive.

20. The modular LED system of claim 1, wherein the LEDs are adapted to be mounted onto the plate by clicking.

* * * * *